United States Patent
Karve et al.

(10) Patent No.: US 10,725,814 B2
(45) Date of Patent: *Jul. 28, 2020

(54) EXPEDITING THE PROVISIONING OF VIRTUAL MACHINES BASED ON CACHED REPEATED PORTIONS OF A TEMPLATE

(71) Applicant: INTERNATIONAL BUSINESS MACHINES CORPORATION, Armonk, NY (US)

(72) Inventors: Alexei Karve, Mohegan Lake, NY (US); Andrzej Kochut, Mount Kisco, NY (US); Ruchi Mahindru, Elmsford, NY (US); Charles O. Schulz, Ridgefield, CT (US); Mahesh Viswanathan, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/109,078

(22) Filed: Aug. 22, 2018

(65) Prior Publication Data

US 2018/0365047 A1    Dec. 20, 2018

Related U.S. Application Data

(63) Continuation of application No. 15/232,127, filed on Aug. 9, 2016, now Pat. No. 10,089,135.

(51) Int. Cl.
    *G06F 9/455*    (2018.01)

(52) U.S. Cl.
    CPC .. *G06F 9/45558* (2013.01); *G06F 2009/4557* (2013.01); *G06F 2009/45562* (2013.01); *G06F 2009/45575* (2013.01)

(58) Field of Classification Search
    CPC ....... G06F 9/45558; G06F 2009/45575; G06F 2009/45562; G06F 2009/4557
    See application file for complete search history.

(56) References Cited

U.S. PATENT DOCUMENTS

| 8,595,722 | B2 | 11/2013 | Gupta et al. |
| 8,862,741 | B1 | 10/2014 | Tegtmeier et al. |

(Continued)

FOREIGN PATENT DOCUMENTS

WO    2013082119    6/2013

OTHER PUBLICATIONS

Mell et al., "The NIST Definition of Cloud Computing", NIST, Special Publication 800-145, Sep. 2011, 7 pages.

(Continued)

*Primary Examiner* — Adam Lee
(74) *Attorney, Agent, or Firm* — Robert Bunker; Andrew D. Wright; Roberts Calderon Safran & Cole, P.C.

(57) ABSTRACT

A computer-implemented method includes receiving a template for creating a virtual machine (VM) instance; separating the template into a repeated portion and a unique portion; determining whether the repeated portion is stored in a cache; creating based on determining that the repeated portion is stored in the cache, the VM instance using the repeated portion stored in the cache; completing the unique portion of the VM instance to create a completed VM instance; and deploying the completed VM instance.

16 Claims, 8 Drawing Sheets

(56) References Cited

U.S. PATENT DOCUMENTS

| | | | |
|---|---|---|---|
| 8,997,095 | B2 | 3/2015 | Gupta |
| 9,152,406 | B2 | 10/2015 | De et al. |
| 9,288,193 | B1* | 3/2016 | Gryb .................. H04L 63/08 |
| 9,710,259 | B2 | 7/2017 | Nagaraja et al. |
| 9,851,988 | B1* | 12/2017 | Elisha .................. G06F 9/5077 |
| 2007/0157185 | A1 | 7/2007 | Semerdzhiev et al. |
| 2009/0089767 | A1 | 4/2009 | Daynes et al. |
| 2010/0257523 | A1 | 10/2010 | Frank |
| 2011/0145502 | A1 | 6/2011 | Joshi et al. |
| 2011/0202795 | A1* | 8/2011 | Marathe .............. G06F 11/1438 714/23 |
| 2012/0066677 | A1 | 3/2012 | Tang et al. |
| 2012/0096457 | A1 | 4/2012 | Gupta et al. |
| 2012/0174068 | A1* | 7/2012 | Gutfleisch ........... G06F 11/3688 717/124 |
| 2012/0210066 | A1 | 8/2012 | Joshi et al. |
| 2012/0240110 | A1 | 9/2012 | Breitgand et al. |
| 2012/0257820 | A1 | 10/2012 | Sanghvi et al. |
| 2012/0311564 | A1 | 12/2012 | Khalid |
| 2013/0055256 | A1 | 2/2013 | Banga et al. |
| 2013/0132950 | A1 | 5/2013 | McLeod et al. |
| 2013/0174117 | A1 | 7/2013 | Watters et al. |
| 2013/0198745 | A1* | 8/2013 | De ..................... G06F 8/71 718/1 |
| 2014/0136711 | A1 | 5/2014 | Benari et al. |
| 2014/0196028 | A1 | 7/2014 | Macpherson et al. |
| 2014/0304414 | A1* | 10/2014 | Yengalasetti ....... H04L 67/1036 709/226 |
| 2015/0063166 | A1 | 3/2015 | Sif et al. |
| 2015/0089494 | A1 | 3/2015 | Beak et al. |
| 2015/0095448 | A1* | 4/2015 | Hwang .............. H04L 67/2842 709/216 |
| 2015/0113527 | A1 | 4/2015 | Diard et al. |
| 2015/0143374 | A1 | 5/2015 | Banga et al. |
| 2015/0180736 | A1 | 6/2015 | Leung |
| 2016/0041837 | A1 | 2/2016 | Rangayya et al. |
| 2016/0147785 | A1 | 5/2016 | Thirumal |
| 2016/0162312 | A1 | 6/2016 | Doherty et al. |
| 2016/0188323 | A1 | 6/2016 | Nagaraja et al. |
| 2016/0323377 | A1* | 11/2016 | Einkauf .............. H04L 67/1076 |
| 2017/0083446 | A1 | 3/2017 | Yang et al. |
| 2017/0155569 | A1 | 6/2017 | Chinnaswamy et al. |
| 2017/0177860 | A1* | 6/2017 | Suarez .................. G06F 21/31 |
| 2017/0228246 | A1 | 8/2017 | Kotha et al. |
| 2017/0346683 | A1* | 11/2017 | Li ....................... H04L 41/0803 |
| 2018/0039524 | A1* | 2/2018 | Dettori ................. G06F 9/5077 |
| 2018/0046482 | A1 | 2/2018 | Karve et al. |

OTHER PUBLICATIONS

De et al., "Caching Techniques for Rapid Provisioning of Virtual Servers in Cloud Environment", IEEE, 2012, https:/lwww3.cs.stonybrook.edu/-prade/MyPubs/2012-noms-cacheCloud.pdf, 4 pages.

Jiang et al., "Cloud Analytics for Capacity Planning and Instant VM Provisioning", Florida International University, hitlpJ/researcher.watson.ibm.com/researcherlfiles/us-akemenUJiang.pdf, Accessed Aug. 8, 2016, 27 pages.

Martin, "Immutable Systems and Ansible—Building and Deploying AMIs to AutoScaling Groups", The Inside Playbook, hitlpJ/www.ansible.com/blog/immutable-systems, Sep. 15, 2014, 10 pages.

Maddox, "Faster Auto Scaling in AWS CloudFormation Stacks with Lambda-backed Custom Resources", https:/lblogs.aws.amazon.com/application-managemenUposUTx38Z5CAM5WWRXW/Faster-Auto-Scaling-in-AWS-CloudFormation-Stacks-with-Lambda-backed-Custom-Resou, AWS DevOps Blog, Aug. 18, 2015, 7 pages.

List of IBM Patents or Patent Applications Treated as Related 1 page.

\* cited by examiner

EXPEDITING THE PROVISIONING OF VIRTUAL MACHINES BASED ON CACHED REPEATED PORTIONS OF A TEMPLATE

BACKGROUND

The present invention generally relates to the provisioning of computing resources and, more particularly, to expediting the provisioning of virtual machine resources in clusters based on cached repeated portions of a template.

Heat Orchestration Template (HOT) is a format or syntax interpretable by an orchestration engine to launch multiple composite cloud applications. HOT may describe an infrastructure pattern and a complete software stack. The HOT syntax allows architects to map components to the Virtual Machines (VMs) in which they run and specify the interdependencies among those components, and provides a mechanism for passing runtime attributes between the interdependent components. The HOT syntax can be provided in a text file and can be treated like computer code. The orchestration engine in a Heat may use a particular HOT to coordinate the deployment of virtual machines, network interfaces, and software components making sure that the dependencies are honored. The heat service provides a human- and machine-accessible service for managing the entire lifecycle of infrastructure and applications within OpenStack clouds. The instantiation of the stack is done with the Heat "stack-create" command. The deployment of the template may be considered to be successful if the orchestration engine is able to successfully instantiate all the resources, which constitute a given stack. Another example for use of templates for provisioning is by using an application, such as Docker Compose® for defining and running multi-container applications where a compose file is used to configure the application's services. All the services from this configuration file can be created and started with a "docker-compose up" command.

As an example, for a stack including an application server cluster (e.g., for a particular application) with a front end load balancer and a backend database, a HOT may describe the installation of an auto-scaling group (or cluster) that will allow the creation of VM instances with the application and also allow removal of nodes (e.g., after draining live sessions). When a new node is added to the auto-scaling group, a new VM is deployed with multiple software deployments which, in turn, trigger respective software configuration management instructions and automation tools depending on the action (e.g., create or delete actions). The multiple software deployments described in a HOT can consist of deploying middleware and deploying the application itself. These deployments can be dependent on previous deployments, and may change based on various parameters that may require configuration changes to the database.

The end to end installation and deployment process for a VM may include installing a base operating system (OS) image, middleware and applications, agents and tooling for managed VMs, which can be time consuming. When the same deployment and configuration is repeated on each resource belonging to an auto-scaling group, installation time continues to become lengthier. For deployments that require a relatively fast provisioning, a lengthy installation time can be problematic and infeasible.

SUMMARY

In an aspect of the invention, a computer-implemented method includes: receiving, by a computing device, a template for creating a virtual machine (VM) instance; separating, by the computing device, the template into a repeated portion and a unique portion; determining, by the computing device, whether the repeated portion is stored in a cache; creating, by the computing device and based on determining that the repeated portion is stored in the cache, the VM instance using the repeated portion stored in the cache; completing, by the computing device, the unique portion of the VM instance to create a completed VM instance; and deploying, by the computing device, the completed VM instance.

In an aspect of the invention, there is a computer program product for expediting the provisioning of VM instances. The computer program product comprises a computer readable storage medium having program instructions embodied therewith, the program instructions executable by a computing device to cause the computing device to: receive a template for creating a VM instance; separate the template into a repeated portion and a unique portion; create the VM instance using an image of the repeated portion stored in a cache as a baseline; complete the VM instance by executing the unique portion of the template; and deploy the completed VM instance.

In an aspect of the invention a system comprises: a CPU, a computer readable memory and a computer readable storage medium associated with a computing device; program instructions to receive a template for creating a virtual machine (VM) instance; program instructions to separate the template into a repeated portion and a unique portion; program instructions to create a repeated VM image by executing code from the repeated portion only; program instructions to save the repeated VM image to a cache for use as a baseline in the deployment of future VM instances having the same repeated portion; program instructions to complete the VM instance by executing the unique portion of the template; and program instructions to deploy the completed VM instance. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
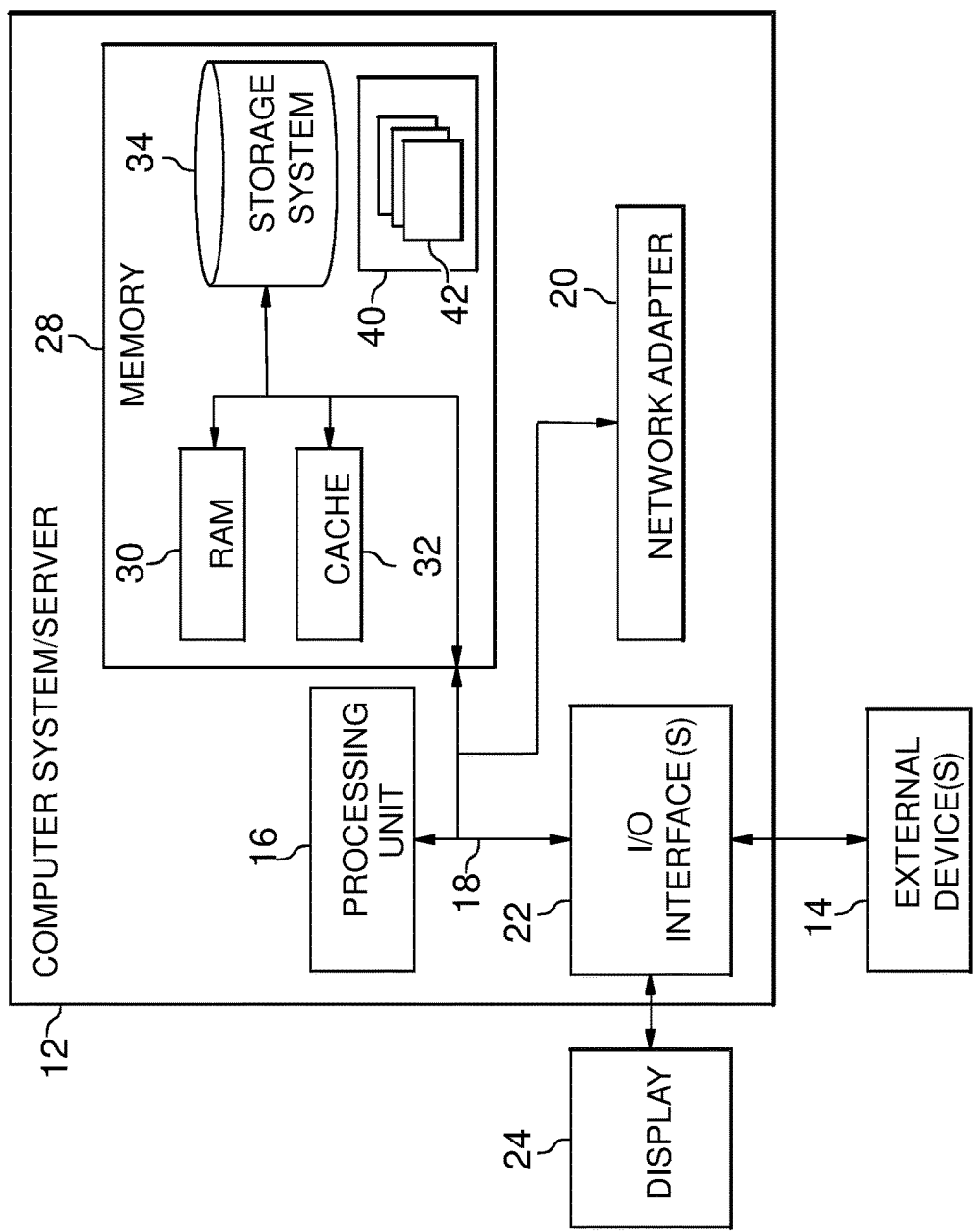
FIG. 1 depicts a cloud computing node according to an embodiment of the present invention.

The present invention generally relates to the provisioning of computing resources and, more particularly, to expediting the provisioning and patching of virtual machine resources in clusters based on cached repeated portions of a template.

Provisioning and deploying a VM may be time consuming, as the provisioning may involve the installation of required operating systems, services, tiers, applications, middleware, software bundles, monitoring agents, etc. For example, the software bundles to be installed may be specified in a HOT. Each layer in a VM may be managed by different vendors, which can add further delays to VM deployment. Accordingly, aspects of the present invention may expedite the deployment of new VMs by using cached VM images with commonly used software bundles as a baseline for creating a new VM instance.

More specifically, embodiments herein may separate a template used for provisioning (e.g., a HOT and/or other type of template) into repeatable and unique portions. The repeatable portions of the template may be stored (e.g., cached) such that the cached repeatable portion may be used to create a new VM instance (e.g., when an auto-scaling group is expanded to include additional nodes or members). As described herein, repeatable portions may include portions of a template that are generic, non-unique, and/or independent of other factors and instructions included in the template. For example, repeatable portions may include instructions with actions to create a VM instance by downloading and installing certain applications, middleware, etc. More specifically, repeatable portions may include portions of the template that are non-unique and are present in multiple different templates and VM deployments. Unique portions may include particular configurations, preferences, credentials etc., that are specific to a particular VM instance (e.g., usernames, passwords, hostnames, etc.).

As described herein, when a new VM instance is to be created from a template, the template is separated into repeated and unique portions. The repeated portion of the template may be created from a cached version of the repeated template, and the unique portion of the template is then used to complete the creation of the VM instance. In this way, the actions of the repeated portions may not need to be performed from scratch, thereby significantly reducing provisioning time. In other words, a cached VM image with a repeated portion of a template may be used to avoid downloading the same software binaries from repositories when creating a new VM instance, thus saving network bandwidth the installation time that may require expanding the binaries and updating the numerous configuration files. Aspects of the prevent invention may also avoid a situation in which installation failures occur when certain web resource required for installation may be unavailable. Further, deployment errors are reduced for future repeatable deployments by avoiding potential installation deltas for the repeated portion.

In embodiments, when VM instances from a particular auto-scaling group are on a same hypervisor, an image of a VM instance may be cached. When on different hypervisors, differences between the images of VM instances may be transferred to the target hypervisor, thereby speeding up deployment even on different hypervisors.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
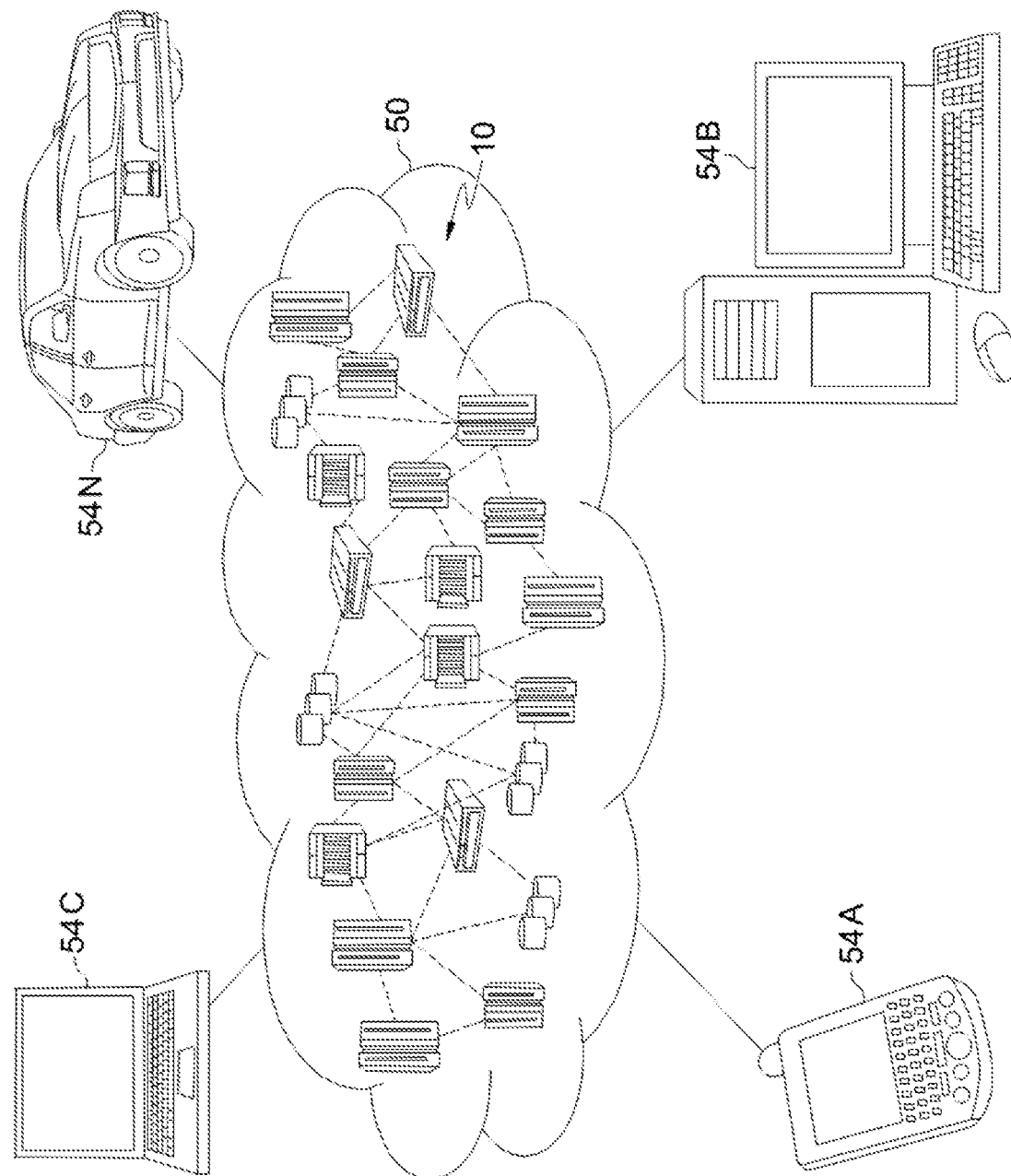
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
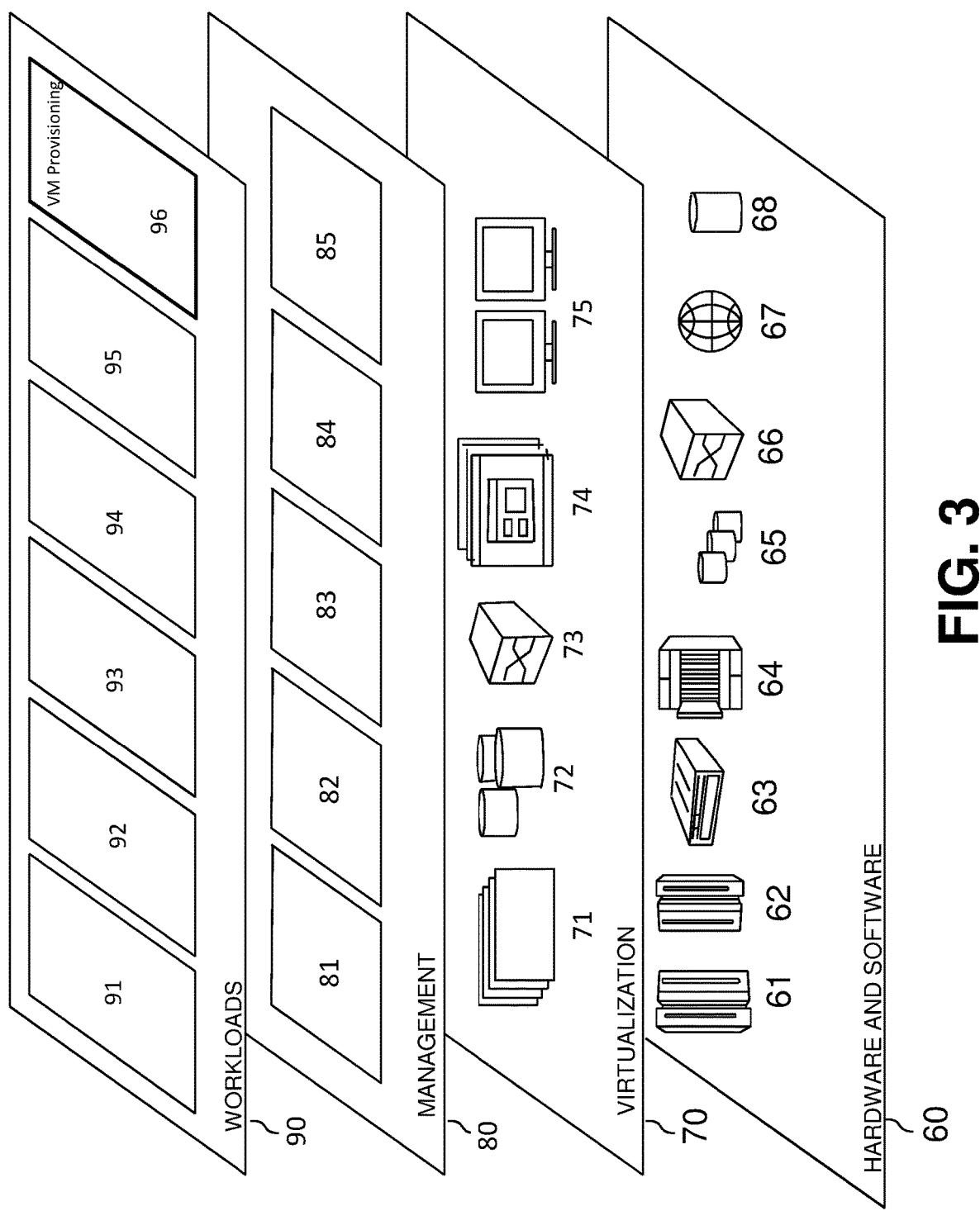
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VM provisioning 96.

Referring back to FIG. 1, the program/utility 40 may include one or more program modules 42 that generally carry out the functions and/or methodologies of embodiments of the invention as described herein (e.g., such as the functionality provided by VM provisioning 96). Specifically, the program modules 42 may receive a template for creating a VM instance, separate the template into repeated and unique portions, assign the repeated portion to an auto-scaling group, determine whether the repeated portion has been previously cached (e.g., by searching a cache or repository), create a new VM using the cached repeated portion, and complete the unique portion of the VM instance. Other functionalities of the program modules 42 are described further herein such that the program modules 42 are not limited to the functions described above. Moreover, it is noted that some of the modules 42 can be implemented within the infrastructure shown in FIGS. 1-4. For example, the modules 42 may be representative of a VM provisioning server as shown in FIG. 4.

Figure 4:
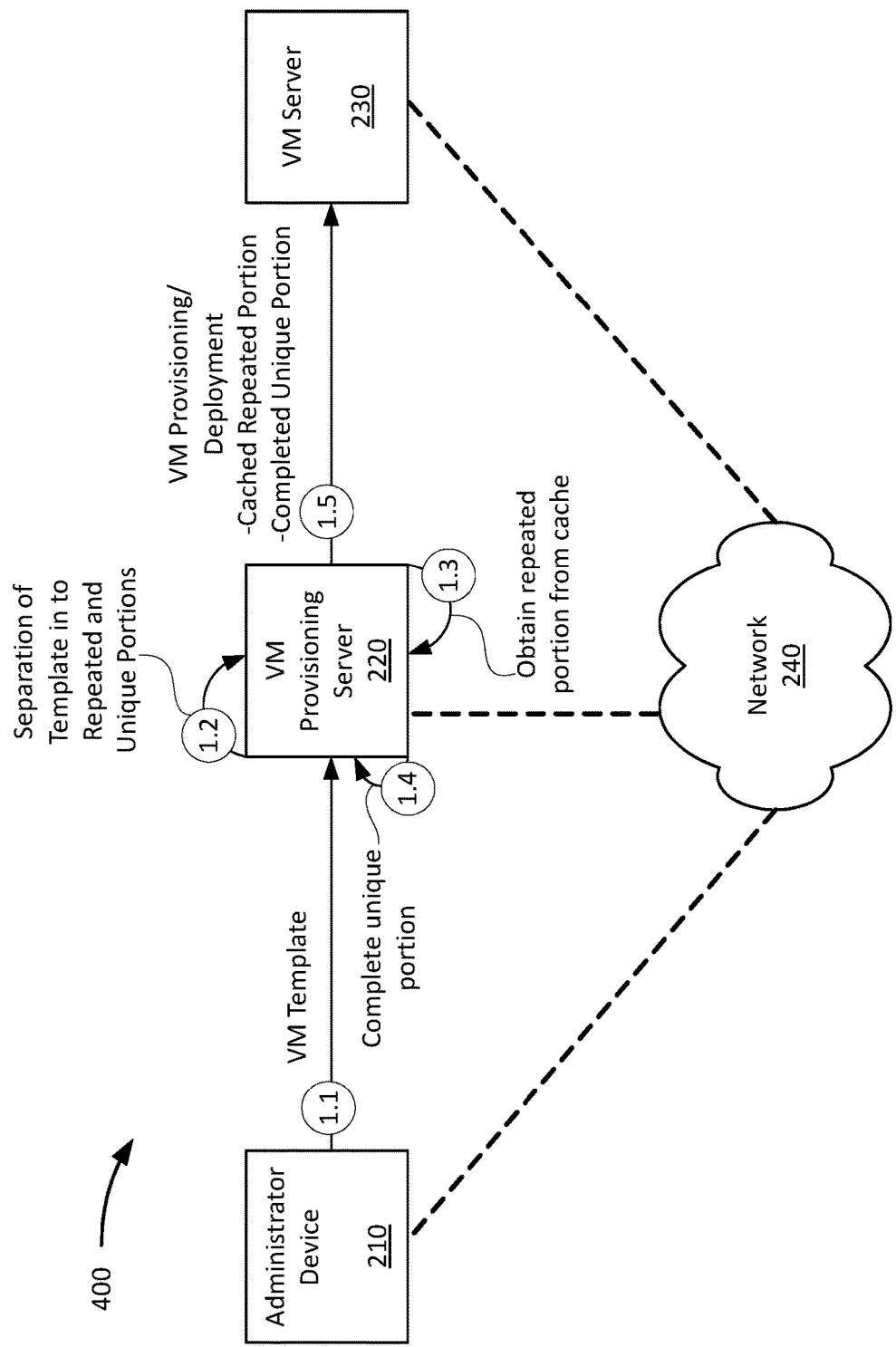
FIG. 4 shows an overview of an example implementation in accordance with aspects of the present invention.

FIG. 4 shows an example environment in accordance with aspects of the present invention. As shown in FIG. 4, environment 400 may include an administrator device 210, a VM provisioning server 220, a VM server 230, and a network 240. In embodiments, one or more components in environment 400 may correspond to one or more components in the cloud computing environment of FIG. 2. Also, one or more components in environment 400 may include the components of computer system/server 12 of FIG. 1 in order to carry out the functions described herein.

The administrator device 210 may include one or more computing devices that may receive instructions from an administrator to provision a new VM instance (e.g., on the VM server 230). The administrator device 210 may include a user interface via which the administrator may input information regarding a VM template (e.g., a HOT) for provisioning the new VM.

The VM provisioning server 220 may include one or more computing devices that may receive a VM template from the administrator device 210, separate the template into repeated and unique portions and obtain a repeated portion from a cache. The VM provisioning server 220 may further complete the unique portion of the template to generate a completed VM image. The VM provisioning server 220 may provide the completed VM image to the VM server 230 to provision/deploy a new VM instance on the VM server 230.

The VM server 230 may include one or more computing devices that may host VMs. In embodiments, the VM server 230 may host VMs associated with different auto-scaling groups. The VM server 230 may host VM instances that have been deployed by the VM provisioning server 220.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

As further shown in FIG. 4, the administrator device 210 may provide a VM template to the VM provisioning server 220 (step 1.1). For example, an administrator may input information regarding the template in order to provision or deploy a new VM instance on the VM server 230. As described herein, the VM template may be, for example, a HOT and/or other type of template used to deploy a VM instance. At step 1.2, the VM provisioning server 220 may separate the template into repeated and unique portions. As described herein, the VM provisioning server 220 may identify portions of the template that are generic, non-unique, and/or independent of other factors and instructions included in the template. As described herein, repeatable portions may include portions of a template that are generic, non-unique, and/or independent of other factors and instructions included in the template. For example, repeatable portions may include instructions with actions to create a VM instance by downloading and installing certain applications, middleware, etc. More specifically, repeatable portions may include portions of the template that are non-unique and are present in multiple different templates and VM deployments. Unique portions may include particular configurations, preferences, credentials etc., that are specific to a particular VM instance (e.g., usernames, passwords, hostnames, etc.).

At step 1.3, the VM provisioning server 220 may obtain the repeated portion from a cache or repository storing repeated portions (e.g., by searching the cache for the repeated portion of the template). At step 1.4, the VM provisioning server 220 may complete the unique portion of the template, thereby creating a completed VM image or instance that includes the cached repeated portion and the completed unique portion. At step 1.5, the VM provisioning server 220 may provision/deploy the VM on the VM server 230. In this way, the completed VM instance is created using the cached repeated portion as a "starting point" or base image. As such, the actions of the repeated portions (e.g., downloading and installing certain applications, middleware, etc.) will not be needed to be performed from scratch, thereby significantly reducing provisioning time.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

Figure 5:
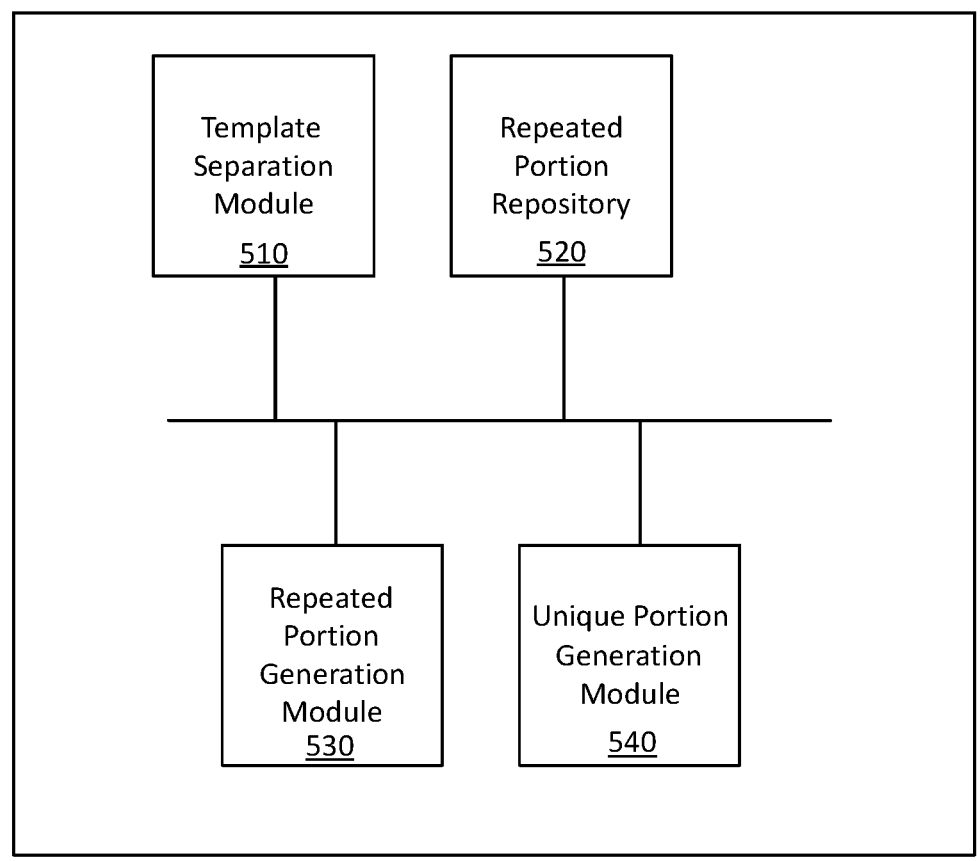
FIG. 5 shows a block diagram of example components of a VM provisioning server in accordance with aspects of the present invention.

FIG. 5 shows a block diagram of example components of a VM provisioning server 220 in accordance with aspects of the present invention. As shown in FIG. 5, the VM provisioning server 220 may include a template separation module 510, a repeated portion repository 520, a repeated portion generation module 530, and a unique portion generation module 540. In embodiments, the VM provisioning server 220 may include additional or fewer components than those shown in FIG. 5. For example, the VM provisioning server 220 may comprise a computer system/server 12 of FIG. 1. In embodiments, separate components may be integrated into a single computing component or module. Additionally, or alternatively, a single component may be implemented as multiple computing components or modules.

The template separation module 510 may include a program module (e.g., program module 42 of FIG. 1) that separates a template into repeated and unique portions. For example, the template separation module 510 may analyze the code or text in the template for dependencies. The template separation module 510 may determine or "tag" portions of code that include dependencies as "unique" portions. For example, a portion of code with a dependency may correspond to a unique portion since the code depends on a previously identified parameter in the template (e.g., a password being dependent on a previous portion of code that retrieves a user name). The template separation module 510 may also determine or tag independent portions of code as "repeated" portions. As described in further detail with respect to FIG. 7, independent portions and repeated portions of code may be "provisionally" tagged followed by further analysis and/or user input to confirm or modify the portions as unique or repeated.

The repeated portion repository 520 may include a data storage device (e.g., storage system 34 of FIG. 1) that stores cached VM images with different sets of repeated portions. For example, the repeated portion repository 520 may store an image that includes particular operating systems, applications, middleware, etc. preinstalled and/or preconfigured. Repeated portion repository 520 may store different cached VM images associated with different auto-scaling groups. The repeated portion repository 520 may maintain a data structure that identifies attributes/metadata of each cached VM image so that the cached VM images can be identified when searched. For example, the data structure may identify each VM image, the operating systems, applications, middleware, etc. associated with each VM image, auto-scaling groups of each VM image, etc. As described above, the VM image with repeated portion may be used as a starting point or base image for generating a final VM image for deployment/provisioning on the VM server 230.

The repeated portion generation module 530 may include a program module (e.g., program module 42 of FIG. 1) that generates a repeated portion for a VM image. In embodiments, the repeated portion generation module 530 may search the repeated portion in the repeated portion repository 520. If a cached VM image that includes the repeated portion is stored by the repeated portion repository 520 (e.g., a cache-hit), the repeated portion generation module 530 may generate the repeated portion using the cached VM image. If a cached VM image is not stored by the repeated portion repository 520 (e.g., a cache-miss), the repeated portion generation module 530 may generate the repeated portion (e.g., from scratch), and may store a VM image with the repeated portion in the repeated portion repository 520 for future use (e.g., for future deployments in which the repeated portion may be used as a basis for generating a final VM image).

The unique portion generation module 540 may include a program module (e.g., program module 42 of FIG. 1) that completes a unique portion for a VM image (in which the repeated portion has been first completed). For example, the unique portion generation module 540 may execute the instructions or code in a template that are identified as "unique" after the completion of the repeated portion of the VM image. In embodiments, a completed VM image may include a VM image that has been provisioned in accordance with the code in a template. As discussed above, the generation of a completed VM image is substantially faster when a cached VM image with a completed repeated portion is used as a basis or starting point for provisioning the VM image.

Figure 6:
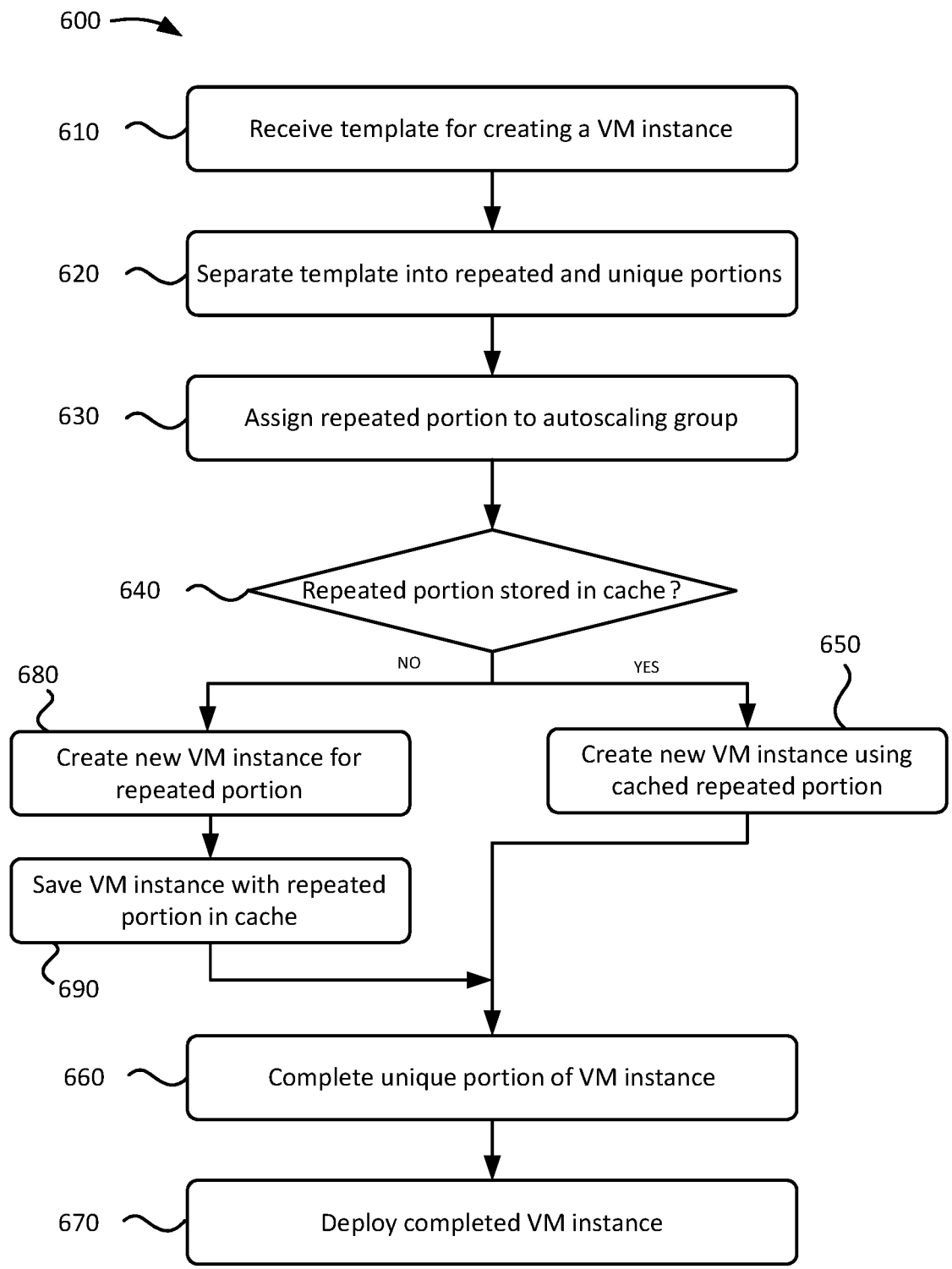
FIG. 6 shows an example flowchart for fast deployment of a VM instance in accordance with aspects of the present invention.

FIG. 6 shows an example flowchart for fast deployment of a VM instance in accordance with aspects of the present invention. The steps of FIG. 6 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 6. process 600 may include receiving a template for creating a VM instance (step 610). For example, the VM provisioning server 220 may receive a template for creating a VM instance from the administrator device 210. In embodiments, the template may include a HOT and/or other type of template that includes information and/or provisioning instructions for the creation of the VM instance (e.g., resources to devote to the VM, network communication protocols for the VM, authorized users for the VM, operating systems, applications, middleware to install on the VM, etc.).

Process 600 may further include separating the template into repeated and unique portions (step 620). For example, as described above with respect to the template separation module 510, the VM provisioning server 220 may separate the received template into repeated and unique portions. In embodiments, the VM provisioning server 220 may replace the original received template with a "tagged template" containing actions to create a repeated image and create a unique image. A stack-create may be issued using the new tagged template. Additional details regarding the separation of the template are discussed below with respect to the flowchart of FIG. 7. In embodiments, the VM provisioning server 220 may create a single repeated portion or multiple different repeated portions.

Process 600 may also include assigning the repeated portion to an auto-scaling group (step 630). For example, the VM provisioning server 220 may assign the repeated portion to a particular auto-scaling group (e.g., a group associated with a particular organization, company, etc.). The VM provisioning server 220 may assign the portion to a particular auto-scaling group based on information included in the template (e.g., header information identifying the auto-scaling group).

Process 600 may further include determining whether the repeated portion is stored in a cache (step 640). For example, the VM provisioning server 220 may determine whether the repeated portion is stored in the cache (e.g., the repeated portion repository 520) by searching the repeated portion repository 520 with search parameters. Example search parameters may include the text or code included in the repeated portion, and/or an identifier of the auto-scaling group.

If, for example, the repeated portion has been previously cached (step 640—YES), process 600 may also include creating a new VM instance using the cached repeated portion (step 650). For example, as described above with respect to the repeated portion generation module 530, the VM provisioning server 220 may create a new VM instance using the repeated portion using the cached VM image (e.g., as a baseline for creating the new VM instance).

Process 600 may further include completing the unique portion of the VM instance (step 660). For example, as described above with respect to the unique portion generation module 540, the VM provisioning server 220 may complete the unique portion of the VM instance by executing the instructions or code in the unique portion of the template (e.g., the portions in the originally received template that are identified as "unique"). In embodiments, the VM provisioning server 220 may complete the unique portion of the template after the completion of the repeated portion of the VM image.

Process 600 may also include deploying the VM instance (step 670). For example, the VM provisioning server 220 may deploy the VM instance by providing the completed VM instance to the VM server 230 for implementation. In this way, the deployment of the VM instance is expedited since the VM instance was created using a cached repeated portion as a baseline for VM creation.

If, at step 640, the repeated portion is not previously cached (step 640-NO), process 600 may include creating a new VM instance for the repeated portion 680. For example, as described above with respect to the repeated portion generation module 530, the VM provisioning server 220 may create the new VM instance and execute only the code in the repeated portion of the template, thereby creating a VM instance with the repeated portion. As an example, the VM provisioning server 220 may create the new VM instance by obtaining and installing operating systems, middleware, applications, etc., as outlined in the repeated portion of the template.

Process 600 may further include saving the VM instance with the repeated portion in the cache. For example, the VM provisioning server 220 may store the VM instance with repeated portion in the cache (e.g., the repeated portion repository 520) for future use (e.g., for future deployments in which the repeated portion may be used as a basis for generating a final VM image). In embodiments, the VM provisioning server 220 may store the VM instance with repeated portion after testing and confirming that the VM instance is operational. In this way, future deployments of VMs having the same repeated portion may be created using the cached VM with the repeated portion as a baseline or "starting point" (e.g., when expanding an auto-scaling group by adding a new node or member). After saving the VM instance with the repeated portion in the cache, process 600 may continue to steps 660 and 670 as described above.

Figure 7:
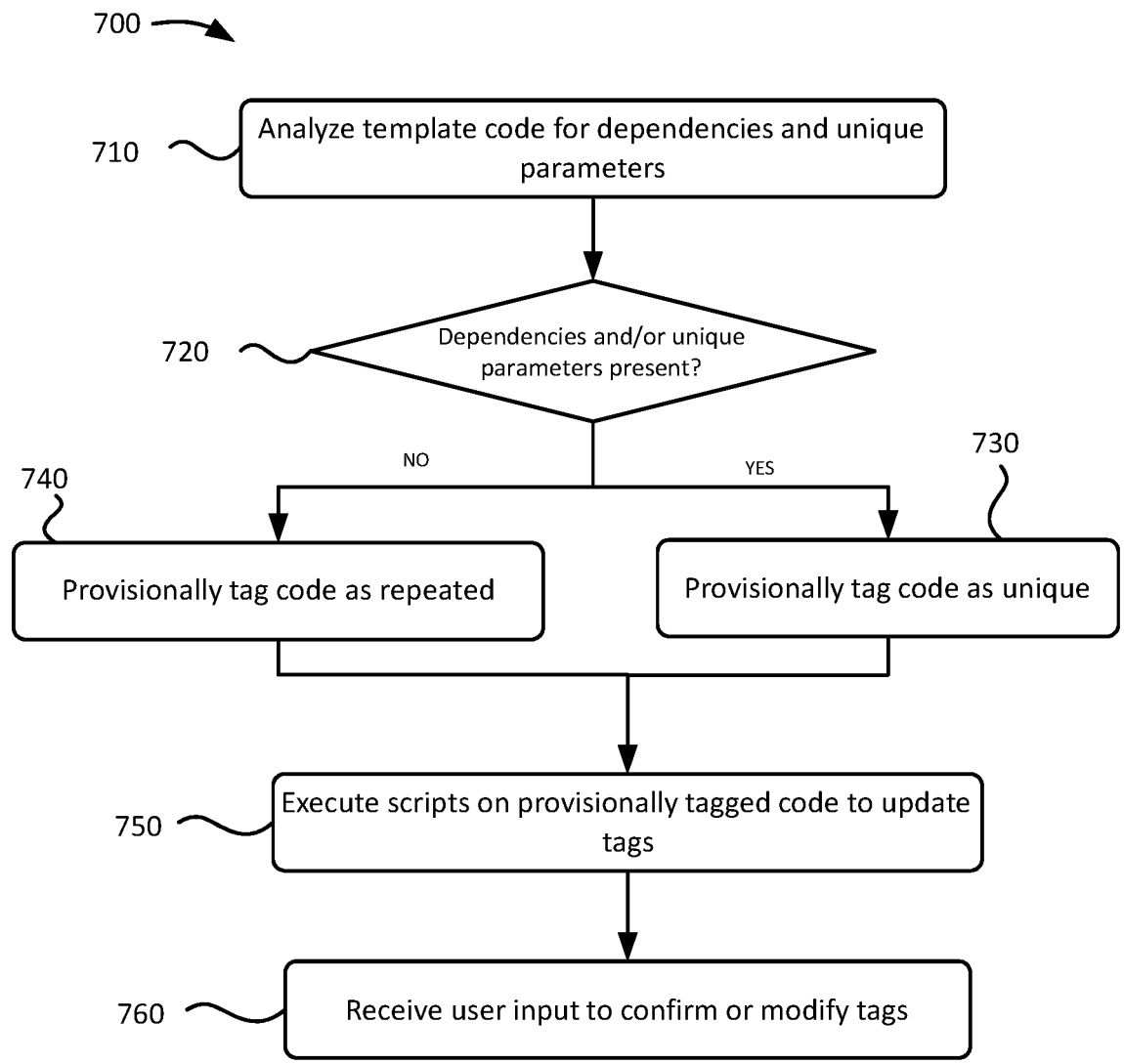
FIG. 7 shows an example flowchart for separating a template into repeatable and unique portions in accordance with aspects of the present invention.

FIG. 7 shows an example flowchart for separating a template into repeatable and unique portions in accordance with aspects of the present invention. The steps of FIG. 7 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention. In embodiments, the steps of FIG. 7 may include sub-steps of step 620 of FIG. 6.

As shown in FIG. 7, process 700 may include analyzing template code for dependencies and unique parameters (step 710). For example, the VM provisioning server 220 may analyze template code for dependencies and unique parameters by parsing the text in the template and searching for dependencies and unique parameters. In embodiments, the VM provisioning server 220 may perform a static analysis on each line or section of template code to determine whether the section of code includes dependencies and/or unique parameters. As described herein, dependencies may include code that requires an input that is obtained based on executing another portion of code (e.g., a unique password based on the retrieval of a username). Unique parameters may include code that identifies a customization of a setting within an application. In embodiments, repeated portions of the template may include the portions of the template that do not include dependencies or unique parameters.

As described herein, a template may include scripts that download binaries (e.g., applications, middleware, etc.), install the binaries, and customize the binaries for specific nodes or parameters. Downloading and installing the binaries may correspond to the repeated portions of the template, whereas customizing the binaries corresponds to the unique portion of the template. The VM provisioning server 220 may identify sections of code that are independent of other sections of code (e.g., code that effectuates the downloading and installing of binaries, but does not effectuate customization).

Process 700 may further include determining whether dependencies and/or unique parameters are present (step 720). For example, the VM provisioning server 220 may determine whether dependencies and/or unique parameters are present for each section of analyzed template code. If, for example, dependencies and/or unique parameters are present (step 720—YES), process 700 may further include provisionally tagging the code as unique (step 730). For example, the VM provisioning server 220 may provisionally tag the code as unique. If, on the other hand, dependencies and/or unique parameters are not present (step 720-NO), process 700 may further include provisionally tagging the code as repeated (step 740). For example, the VM provisioning server 220 may provisionally tag the code as unique.

Process 700 may also include executing scripts on provisionally tagged code to update the tags (step 750). For example, the VM provisioning server 220 may execute scripts on the provisionally tagged code to update the tags (e.g., update a provisionally tagged repeated code as unique, or vice versa). In embodiments, the VM provisioning server 220 may execute the scripts to correct tags that were initially tagged incorrectly or for unique portions that can be provisioned as repeated portions (e.g., using a script). As an example, the VM provisioning server 220 may execute a script to change a provisionally tagged unique code to a repeated code when the code includes custom or unique parameters (such as custom names for a cell, node, or server). In this example, the changing of names for the cell, node, or server can be tagged as repeated, and a script can be executed during the provisioning of a VM instance to change the name (e.g., since changing the name using the script will be less time consuming than a fresh installation with the custom name). As another example, a provisionally tagged repeated code may be changed to unique based on a script that identifies a dependency in an what initially appears to be independent code (e.g., a code in which a current state from a VM is needed).

Process 700 may further include receiving user input to confirm or modify tags (step 760). For example, the VM provisioning server 220 may present the tagged repeated and unique portions to a user or administrator. The user may review the repeated and unique portions to confirm the accuracy of the tags. In embodiments, the user may update a portion of code (e.g., to unique from repeated, or vice versa) based on prior knowledge or other factors that indicate that the tag should be changed. As an example, for a tagged repeated portion, the user may modify the repeated portion to unique when updates to applications are needed (e.g., such that provisioning of the VM will download the updated application instead of using a repeated portion with an outdated application).

Figure 8:
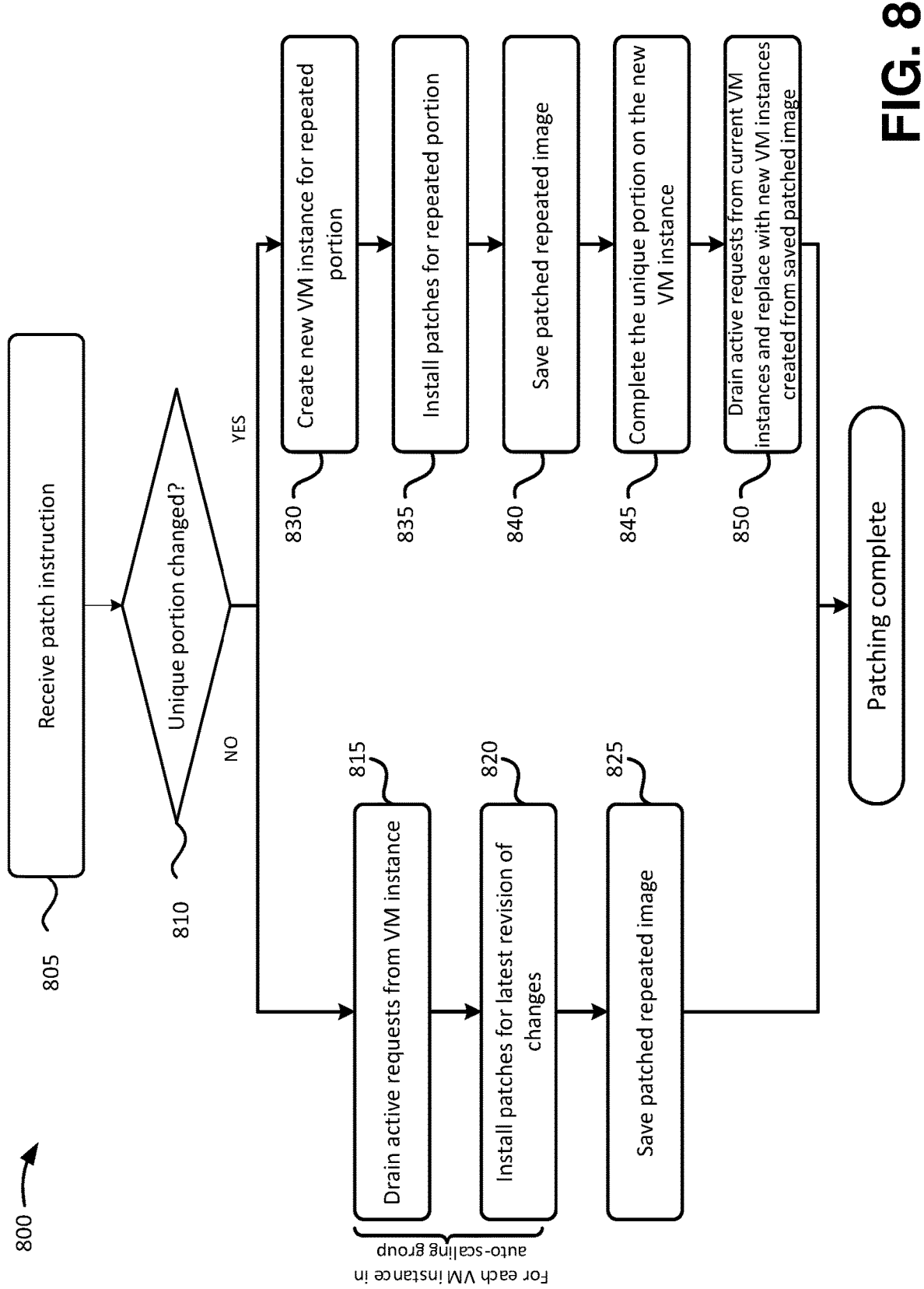
FIG. 8 shows an example process for patching or modifying a VM instance in accordance with aspects of the present invention.

FIG. 8 shows an example process for patching or modifying a VM instance in accordance with aspects of the present invention. The steps of FIG. 8 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 8, process 800 may include receiving a patch instruction (step 805). For example, the VM provisioning server 220 may receive a patch instruction from the administrator device 210. In embodiments, the patch instruction may identify modifications to make to a particular VM instance (e.g., modifications relating to applications, middleware, operating systems, etc. implemented by the VM instance). In embodiments, the patch instruction may include text or code that identifies the modifications.

Process 800 may further include determining whether the patch instruction includes a change to the unique portion of the VM instance (step 810). For example, the VM provisioning server 220 may determine whether the patch instruction includes a change to the unique portion. In embodiments, the VM provisioning server 220 may analyze the patch instruction and determine whether any changes to a previously determined unique portion are being made (e.g., as previously determined via process 700). For example, the VM provisioning server 220 may determine that changes to the unique portion are being made when the patch instruction includes a modification to a previously determined unique portion. In embodiments, idempotent install code may be used to determine whether the patch instruction includes a change to the unique portion of the VM instance.

If for example, the unique portion is not being changed and only the repeated portion is changed (step 810-NO), process 800 may include draining active requests from the VM instance (step 815). For example, the VM provisioning server 220 may drain active requests from the VM instance (e.g., by discarding any requests to access or receive services from the VM instance).

Process 800 may also include installing patches for latest revisions of changes (step 820). For example, the VM provisioning server 220 may install the patches in accordance with the patch instruction. Steps 815 and 820 may be repeated for each VM instance in the same auto-scaling group as the VM instance identified in the patch instruction. In this way, the repeated portions for all VM instances in the same auto-scaling group will be patched.

Process 800 may further include saving the patched repeated image of the VM instance (step 825). For example, the VM provisioning server 220 may save a repeated image of the VM instance which includes the installed patches (e.g., in the repeated portion repository 520). The updated saved repeated image may be used for the deployment of future VM instances such that the most up to date patch is implemented in future VM instances.

If, at step 810, the unique portion is being changed (e.g., in addition to the repeated portion), process 800 may include creating a new VM instance for the repeated portion (step 830). For example, the VM provisioning server 220 may create a new VM instance for the repeated portion as a baseline for which a patched repeated portion will be created and saved.

Process 800 may further include installing patches for the repeated portion (step 835). For example, the VM provisioning server 220 may install the patches for the repeated portion of the VM instance in accordance with the patch instruction. Process 800 may also include saving the patched repeated image (step 840). For example, the VM provisioning server 220 may save a repeated image of the VM instance which includes the installed patches (e.g., in the repeated portion repository 520). The updated saved repeated image may be used for the deployment of future VM instances such that the most up to date patch is implemented in future VM instances.

Implementations described herein may also be used for containers in addition to provision of VM instances. For example, techniques described herein may be used to rearrange RUN commands (e.g., for building container images) into repeatable and unique portions.

Process 800 may further include completing the unique portion on the new VM instance (step 845). For example, the VM provisioning server 220 may complete the unique portion on the new VM instance in accordance with the patch instruction. Process 800 may also include draining active requests from current VM instances and replace with new VM instances created from patched image (step 850). For example, for each VM instance in the same auto-scaling group as the VM instance identified in the patch instruction, the VM provisioning server 220 may drain the active requests and replace the current VM instances with the new VM instances created from the newly saved patched repeated image. In this way, the patching is completed for all of the VM instances in the auto-scaling group. In embodiments, a data cleansing technique may be used when patching VM instances (e.g., when customer specific data is present on a VM instance and the image of the instance is used across multiple deployments)

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computing device, a template for creating a virtual machine (VM) instance, wherein the template includes a repeated portion and a unique portion, and wherein the repeated portion includes a portion of the template that is generic, non-unique, or independent of other factors and instructions included in the template;
    separating, by the computing device, the template into the repeated portion and the unique portion;
    determining, by the computing device, whether the repeated portion is stored in a cache in the computing device;
    creating, by the computing device and based on determining that the repeated portion is stored in the cache, the VM instance using the repeated portion stored in the cache;
    completing, by the computing device, the unique portion of the VM instance to create a completed VM instance; and
    deploying, by the computing device, the completed VM instance to a VM server, wherein the separating the template into the repeated portion and the unique portion includes:
    analyzing code included in the template for dependencies and unique parameters;
    tagging code with dependencies or unique parameters as the unique portion; and
    tagging code without dependencies or unique parameters as the repeated portion.

2. The computer-implemented method of claim 1, wherein the unique portion includes particular configurations, preferences, credentials, or other information that is specific to the VM instance.

3. The computer-implemented method of claim 1, further comprising:
    responsive to determining that the repeated portion is not stored in the cache, creating a new VM instance that includes the repeated portion; and
    saving the VM instance that includes the repeated portion in the cache,
    wherein completing the unique portion is based on saving the VM instance that includes the repeated portion in the cache.

4. The computer-implemented method of claim 1, further comprising assigning the repeated portion to an auto-scaling group, wherein the determining whether the repeated portion is stored in the cache includes determining an identifier associated with the auto-scaling group.

5. The computer-implemented method of claim 1, wherein the determining whether the repeated portion is stored in the cache includes searching the cache using search parameters including a text or code included in the repeated portion and an identifier of an auto-scaling group.

6. The computer-implemented method of claim 1, further comprising:
    executing scripts to update the tags; and
    receiving user input to confirm or modify the tagged code.

7. The computer-implemented method of claim 1, wherein the template is a Heat Orchestration Template (HOT).

8. The computer-implemented method of claim 1, wherein the deploying the completed VM instance includes providing the completed VM instance to a virtual machine server that hosts virtual machines.

9. The computer-implemented method of claim 1, wherein a service provider at least one of creates, maintains, deploys and supports the computing device.

10. The computer-implemented method of claim 1, wherein steps of claim 1 are provided by a service provider on a subscription, advertising, and/or fee basis.

11. The computer-implemented method of claim 1, wherein the computing device includes software provided as a service in a cloud environment.

12. The computer-implemented method of claim 1, further comprising deploying a system for expediting the provisioning of VM instances comprising providing a computer infrastructure operable to perform the steps of claim 1.

13. A computer program product for expediting the provisioning of virtual machine (VM) instances, the computer program product comprising a computer readable storage medium having program instructions embodied therewith, the program instructions executable by a computing device to cause the computing device to:

receive a template for creating a VM instance, wherein the template includes a repeated portion and a unique portion, and wherein the repeated portion includes a portion of the template that is generic, non-unique, or independent of other factors and instructions included in the template;

separate the template into the repeated portion and the unique portion;

create the VM instance using an image of the repeated portion stored in a cache in the computing device as a baseline;

complete the VM instance by executing the unique portion of the template; and deploy the completed VM instance to a VM server, wherein the program instructions to separate the template into the repeated portion and the unique portion cause the computing device to:

analyze code included in the template for dependencies and unique parameters;

tag code with dependencies or unique parameters as the unique portion; and tag code without dependencies or unique parameters as the repeated portion.

14. The computer program product of claim 13, wherein the template is a Heat Orchestration Template (HOT).

15. The computer program product of claim 13, wherein the dependencies include code that requires an input that is obtained based on excluding another portion of code and the unique parameters include code that identifies a customization of a setting within an application.

16. A system comprising:

a CPU, a computer readable memory and a computer readable storage medium associated with a computing device;

first program instructions to receive a template for creating a virtual machine (VM) instance, wherein the template includes a repeated portion and a unique portion, and wherein the repeated portion includes a portion of the template that is generic, non-unique, or independent of other factors and instructions included in the template;

second program instructions to separate the template into the repeated portion and the unique portion;

third program instructions to create a repeated VM image by executing code from the repeated portion only;

fourth program instructions to save the repeated VM image to a cache for use as a baseline in the deployment of future VM instances having the same repeated portion;

fifth program instructions to complete the VM instance by executing the unique portion of the template;

sixth program instructions to deploy the completed VM instance to a VM server;

seventh program instructions to receive a patch instruction to patch the VM instance;

eighth program instructions to create a new VM instance for the repeated portion;

ninth program instructions to install a patch in accordance with the patch instruction;

tenth program instructions to save the new VM instance as an updated repeated image in the cache for use as a baseline in the deployment of future VM instances having the same repeated portion; and eleventh program instructions to drain active requests from current VM instances associated with the patch instruction and replace the current VM instances using the updated repeated image, wherein the unique portion includes particular configurations, preferences, credentials, or other information that is specific to the VM instance, wherein the program instructions are stored on the computer readable storage medium for execution by the CPU via the computer readable memory.

* * * * *